United States Patent
Flamard et al.

(10) Patent No.: US 8,297,684 B1
(45) Date of Patent: Oct. 30, 2012

(54) FOLDING ARMREST

(75) Inventors: Anne Flamard, Dearborn, MI (US);
Susan Walowich, Wyandotte, MI (US);
Mickey Jones, Westland, MI (US);
Leonard Anthony Shaner, New Baltimore, MI (US); Edgar Edward Donabedian, Livonia, MI (US); Arthur C. Haman, Oakland Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/103,717

(22) Filed: May 9, 2011

(51) Int. Cl.
*B60J 5/06* (2006.01)
*B60N 2/46* (2006.01)

(52) U.S. Cl. .................................. 296/153; 296/1.09
(58) Field of Classification Search .................. 296/153, 296/1.09; 297/411.21, 411.32
See application file for complete search history.

(56) References Cited

U.S. PATENT DOCUMENTS

| | | | | |
|---|---|---|---|---|
| 2,008,709 A * | 7/1935 | Hammond, Jr. | .............. | 369/174 |
| 2,708,135 A * | 5/1955 | Howard | .......................... | 296/63 |
| 2,897,000 A * | 7/1959 | McBride Hart et al. | ...... | 296/153 |
| 4,453,760 A * | 6/1984 | Hira | ............................ | 296/37.13 |
| 5,076,645 A * | 12/1991 | Yokota | ..................... | 297/411.32 |
| 6,145,919 A | 11/2000 | Mysliwiec et al. | | |
| 6,568,743 B1 * | 5/2003 | Jayasuriya et al. | ........... | 296/153 |
| 6,837,544 B2 * | 1/2005 | Bornchen et al. | ........ | 297/411.21 |
| 6,905,163 B2 * | 6/2005 | Bornchen et al. | ............. | 296/153 |
| 7,384,092 B2 | 6/2008 | Hodges | | |
| 7,654,597 B1 * | 2/2010 | Farooq | ........................ | 296/1.09 |
| 7,758,102 B2 | 7/2010 | Quigley et al. | | |
| 8,020,923 B2 * | 9/2011 | Gaudig | ............. | 296/153 |
| 2004/0100122 A1 * | 5/2004 | Bornchen et al. | ............. | 296/153 |
| 2008/0164718 A1 | 7/2008 | Quigley et al. | | |
| 2009/0256374 A1 * | 10/2009 | Augustyn | ................... | 296/1.09 |
| 2010/0045067 A1 | 2/2010 | Schulz | | |

\* cited by examiner

*Primary Examiner* — Glenn Dayoan
*Assistant Examiner* — Gregory Blankenship
(74) *Attorney, Agent, or Firm* — Raymond L. Coppiellie; Price Heneveld LLP (57) ABSTRACT

A vehicle folding armrest assembly having a vehicle door movable within a door frame and having an armrest that is operable between a deployed position and a stowed position. A catch mechanism is movable between an interference position, wherein the catch mechanism supports the armrest in the deployed position against a spring force, and a non-interference position, wherein the catch mechanism is disengaged from the armrest, and the armrest is in the stowed position. An actuator includes a lever that protrudes from the vehicle door. The lever is in abutting contact against the door frame and moves the catch mechanism from the interference position to the non-interference position.

20 Claims, 9 Drawing Sheets

FOLDING ARMREST

FIELD OF THE INVENTION

The present invention generally relates to a folding armrest, and more specifically to a folding armrest designed for use on a sliding occupant door of a vehicle.

BACKGROUND OF THE PRESENT INVENTION

Vehicle armrests provide comfort and load-bearing functionality inside vehicles. However, armrests can also take up space and limit an occupant's range of motion in the vehicle.

SUMMARY OF THE PRESENT INVENTION

One aspect of the present invention includes a vehicle folding armrest assembly having a vehicle door movable within a door frame and having an armrest that is operable between a deployed position and a stowed position. A catch mechanism is movable between an interference position, wherein the catch mechanism supports the armrest in the deployed position against a spring force, and a non-interference position, wherein the catch mechanism is disengaged from the armrest, and the armrest is in the stowed position. An actuator includes a lever that protrudes from the vehicle door. The lever is in abutting contact against the door frame and moves the catch mechanism from the interference position to the non-interference position.

Another aspect of the present invention includes a vehicle armrest assembly having a spring-biased armrest movable between a deployed position and a stowed position and a spring-biased actuator. A spring-biased catch mechanism is operably coupled with the spring-biased actuator and adapted to engage and support the armrest when the spring-biased actuator has been depressed. The spring-biased catch mechanism is further adapted to disengage the armrest when the spring-biased actuator is released, such that the spring-biased armrest moves to the stowed position.

Another aspect of the present invention includes a folding armrest assembly having a spring-biased armrest movable between deployed and stowed positions. A catch mechanism is operably coupled with an actuator and movable between an interference position to support the armrest in the deployed position, and a non-interference position, wherein the catch mechanism does not support the armrest. A base moves the catch mechanism under the force of inertia to the non-interference position during a collision event.

These and other aspects, objects, and features of the present invention will be understood and appreciated by those skilled in the art upon studying the following specification, claims, and appended drawings.

DETAILED DESCRIPTION OF EMBODIMENTS

Figure 1:
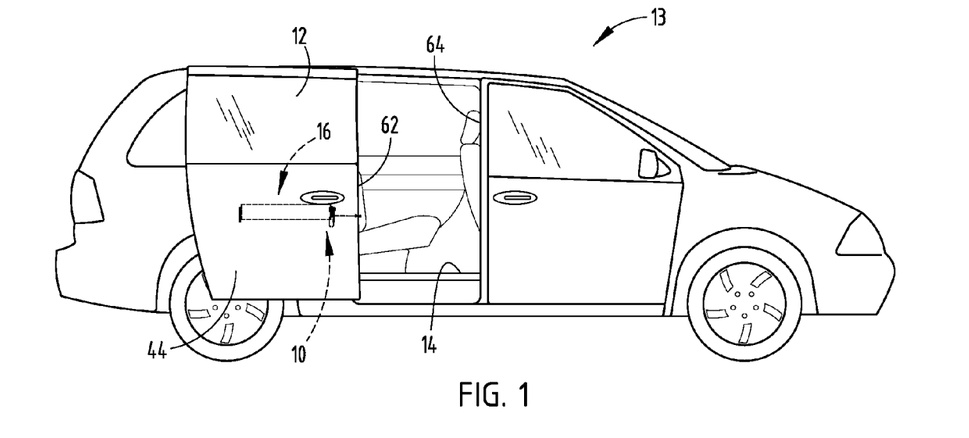
FIG. 1 is a side elevational view of a vehicle that includes one embodiment of a folding armrest assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4C, the reference numeral 10 generally designates a vehicle folding armrest assembly disposed in a door 12 of a vehicle 13 that is movable within a vehicle door frame 14. The vehicle folding armrest assembly 10 includes an armrest 16 that is operable between a deployed position 18 and a stowed position 20. A catch mechanism 22 is movable between an interference position 24, wherein the catch mechanism 22 supports the armrest 16 in the deployed position 18 against a spring force, and a non-interference position 26, wherein the catch mechanism 22 is disengaged from the armrest 16, and the armrest 16 is in the stowed position 20. An actuator 30 includes a lever 32 that protrudes from the vehicle door 12. The lever 32 is in abutting contact against the vehicle door frame 14 and moves the catch mechanism 22 from the interference position 24 to the non-interference position 26.

Figure 2A:
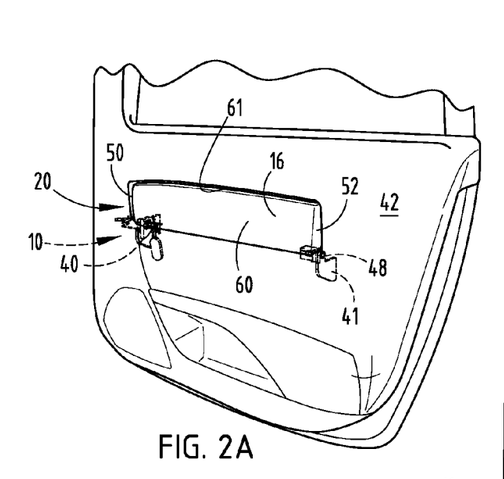
FIG. 2A is a partial rear perspective view of a stowed armrest.
Figure 2B:
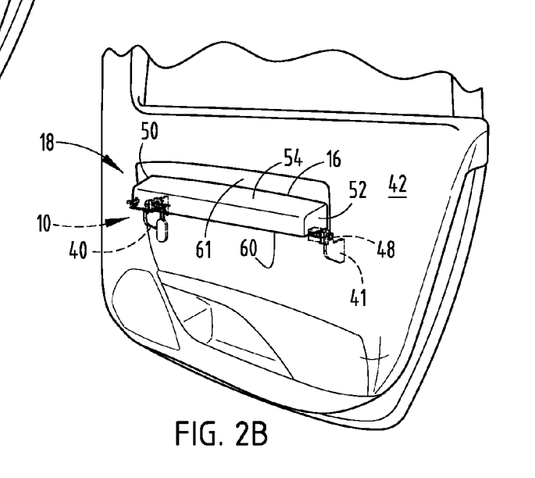
FIG. 2B is a partial rear perspective view of a deployed armrest.

Referring now to FIGS. 1, 2A, and 2B, the illustrated embodiment of the vehicle folding armrest assembly 10 includes forward and rearward support brackets 40, 41 disposed between an interior liner 42 of the vehicle door 12 and an exterior panel 44 of the vehicle door 12. The support brackets 41 include apertures 46 (FIG. 3A) adapted to receive pins 48 (FIGS. 3A and 4A) that extend from forward and rearward ends 50, 52 of the armrest 16. Accordingly, the armrest 16 is rotatable about the pins 48 between the deployed position 18 and stowed position 20. When the armrest 20 is in the deployed position, a top surface 54 of the armrest 16 is in a horizontal position available to support the arm of a user. In the stowed position 20, the armrest 16 is received in a cavity 61 in the interior liner 42 of the vehicle door 12. It is generally contemplated that when the armrest 16 is in the stowed position 20, a bottom surface 60 (FIG. 2A) of the armrest 16 will generally be flush with the surface of the interior liner 42 of the vehicle door 12. However, it is also contemplated that the bottom surface 60 of the armrest 16 may extend outward slightly from the interior liner 42 of the vehicle door 12 or be slightly recessed inside the interior liner 42 of the vehicle door 12 inside the cabin of the vehicle 13. A front end 62 of the vehicle door 12 is designed for abutting engagement with a front end 64 of the vehicle door frame 14. It will be understood that the vehicle folding armrest assembly 10 may be incorporated on a variety of door structures, including front and rear doors, and that the illustrated embodiment is to serve as an example and not meant to be limiting.

Figure 3A:
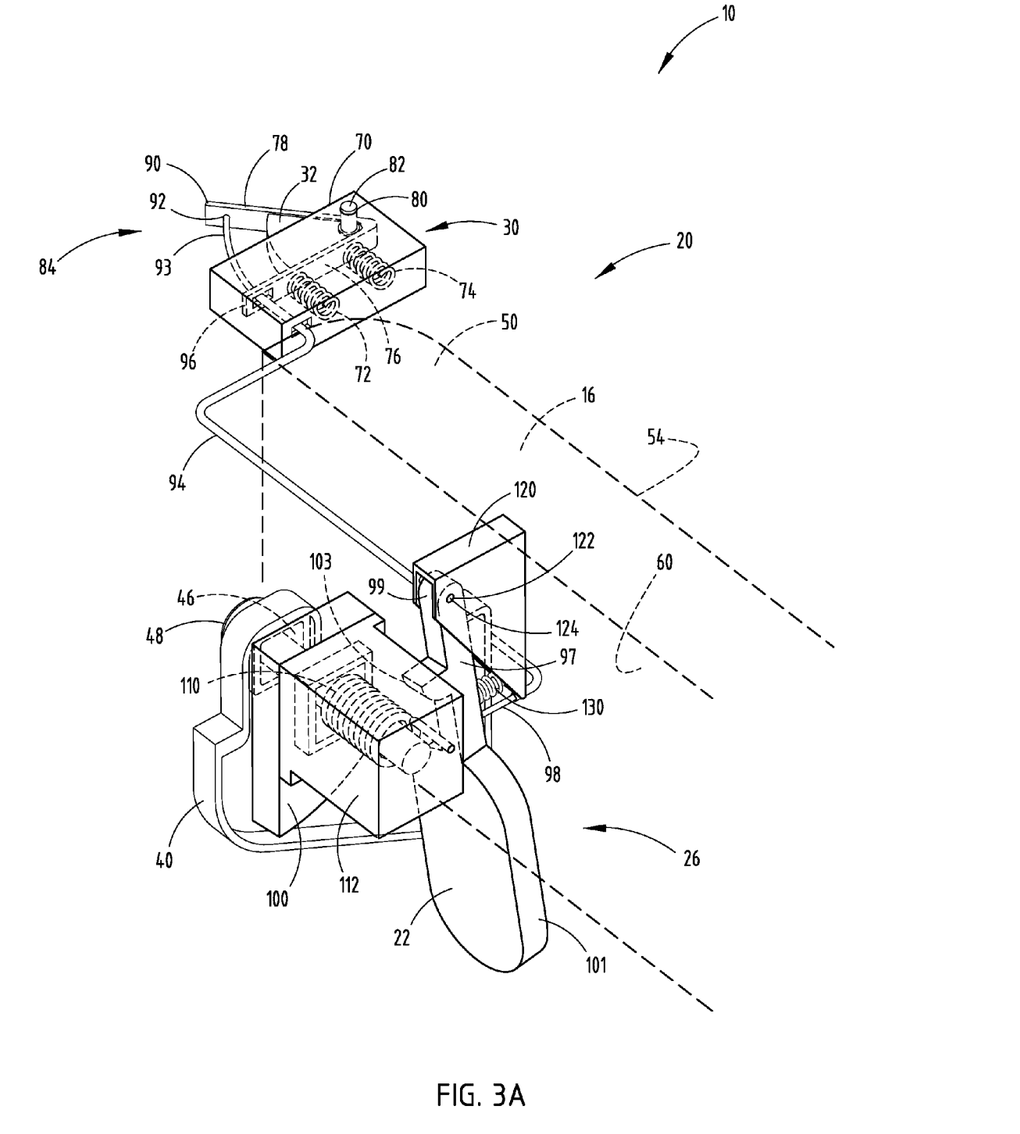
FIG. 3A is a partial top rear perspective view of an armrest when the armrest is in the stowed position.
Figure 3B:
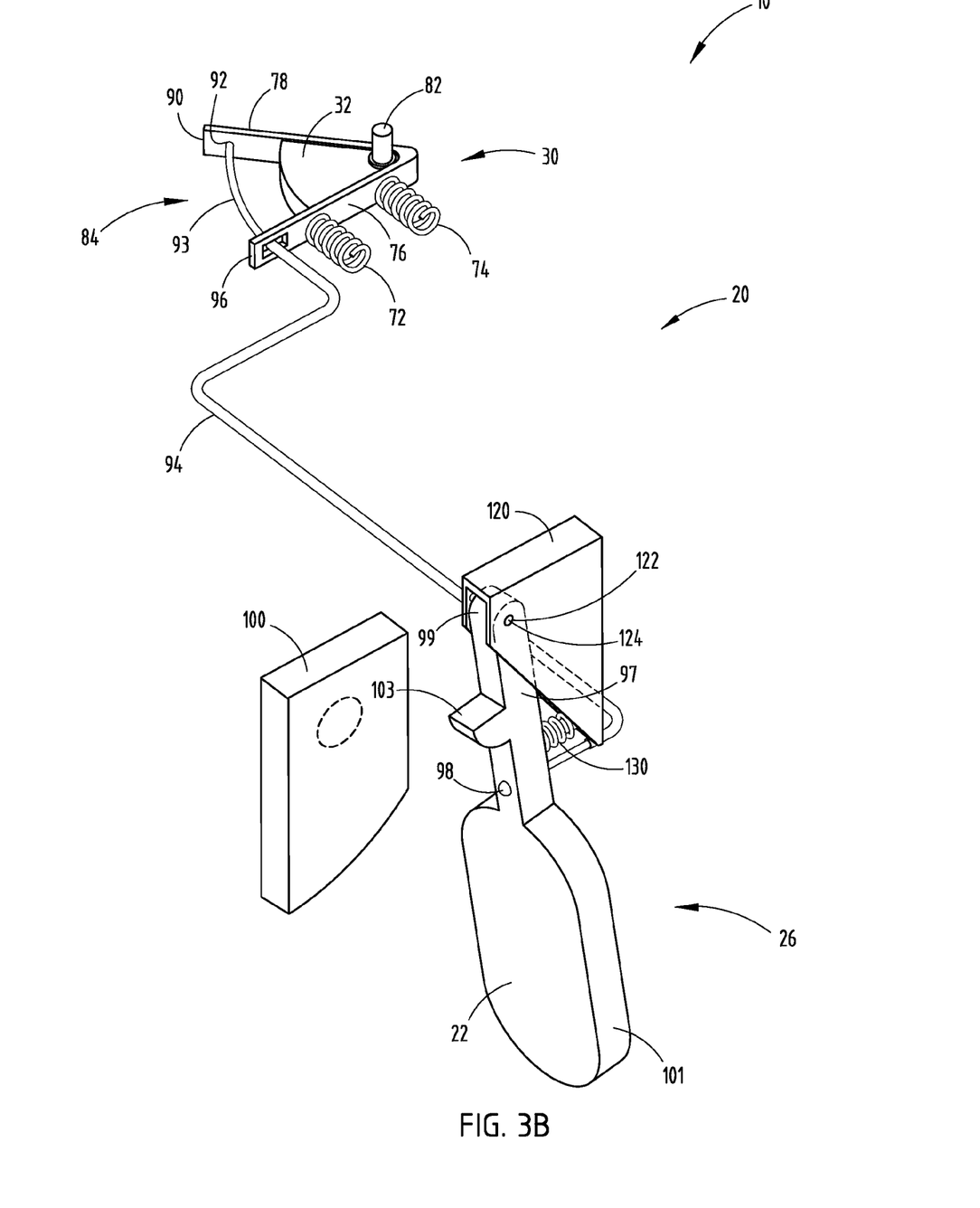
FIG. 3B is a top rear perspective view of one embodiment of an actuator and a catch mechanism when the armrest is in the in the stowed position.
Figure 3C:
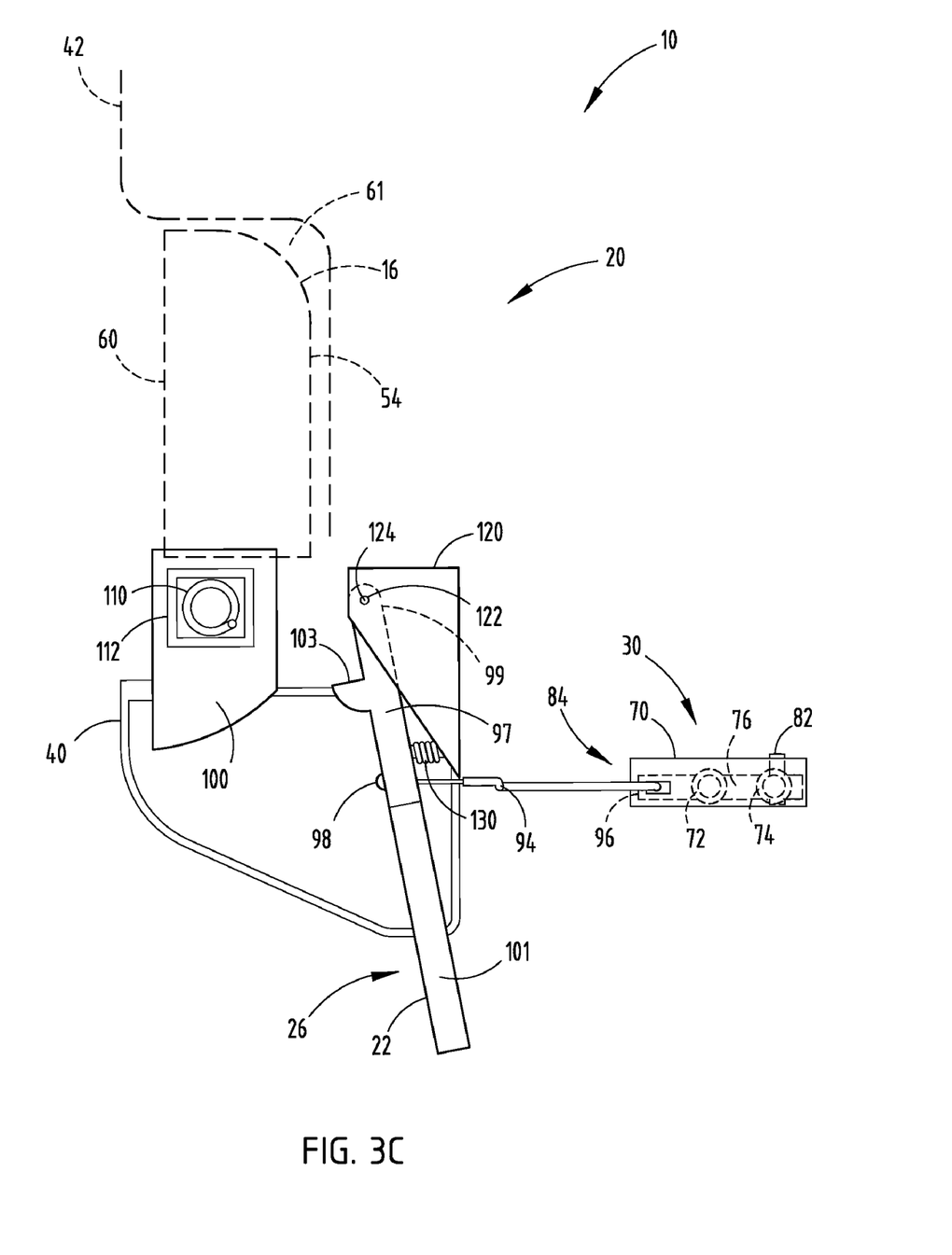
FIG. 3C is a front elevational view of the armrest when the armrest is in the stowed position.

Referring now to FIGS. 3A-3C, the actuator 30 includes a housing 70 adapted to support the lever 32 therein. First and second springs 72, 74 are disposed inside the housing 70. The first and second springs 72, 74 are in abutting contact with an interior arm 76 of the lever 32, thereby biasing the lever 32 outward. The interior arm 76 is connected with an exterior arm 78 that protrudes outwardly from the housing 70. Both the interior arm 76 and exterior arm 78 are pivotally connected with the housing 70. More specifically, the interior arm 76 and exterior arm 78 are generally fixably connected, forming the lever 32, which has a generally V-shaped construction. The lever 32 includes an aperture 80 designed to receive a pin 82 that extends inside the housing 70.

The lever 32 is rotatable about the pin 82 between an extended position 84 (FIGS. 3A-3C) when the door 12 is open and a retracted position 86 (FIGS. 4A-4C) when the door is closed. A distal end 90 of the exterior arm 78 includes an aperture 92 adapted to receive a first end 93 of a cable 94, such as a Bowden cable, that extends through the distal end 90 of the exterior arm 78 and also through a distal end 96 of the interior arm 76. The cable 94 generally extends through the vehicle door 12 and has a second end 98 that connects with the catch mechanism 22, as shown in FIG. 3B. The catch member 22 includes a neck 97. A pivot end 99 is disposed at a top end of the neck 97 and a base 101 is disposed at a bottom end of the neck 97. The base 101 is weighted to provide an additional safety feature to the vehicle folding armrest assembly 10, as disclosed in further detail herein. A knob 103 is positioned on the neck 97 between the pivot end 99 and the base 101. The knob 103 is designed to interface with a latch member 100 operably connected with the armrest 16.

Referring again to FIGS. 3A-3C, it is generally contemplated that the actuator 30 may be disposed anywhere along an outer periphery of the vehicle door 12. In one embodiment, the actuator 30 is disposed on the front end 62 (FIG. 1) of the vehicle door 12, such that upon closure of the vehicle door 12, the exterior arm 78 is rotated about the pin 82 of the housing 70 from the extended position 84 to the retracted position 86, which subsequently allows the catch mechanism 22 to engage the latch member 100 located proximate the bottom surface 60 of the armrest 16, thereby allowing the armrest 16 to be moved to and maintained in the deployed position 18, as described in further detail below.

Referring now to FIGS. 3A-4C, the support brackets 40, 41 that support the armrest 16 in both the deployed position 18 and stowed position 20 are also operably connected with a coil spring 110 that biases the armrest 16 to the stowed position 20 at all times. The coil spring 110 is disposed inside a spring housing 112. The latch member 100 of the armrest 16 is disposed between the forward support bracket 40 and the spring housing 112 in alignment with a knob 103 that protrudes from the catch mechanism 22. The catch mechanism 22 is pivotally connected with a catch support 120. The catch support 120 includes apertures 122 adapted to receive a pin 124, which also extends through the catch mechanism 22, thereby supporting the catch mechanism 22 in a pivotal connection below the armrest 16. A compression spring 130 is disposed below the pin 124 between the catch mechanism 22 and the catch support 120. The compression spring 130 biases the catch mechanism 22 to the interference position 24. Notably, the force of the spring bias of the compression spring 130 is less than the force of the spring bias of the first and second springs 72, 74 combined disposed inside the actuator housing 70. Therefore, the catch mechanism 22 maintains the non-interference position 26 until the lever 32 is moved to the retracted position 86 and the exterior arm 78 is retracted, such as when the exterior arm 78 abuts the front end 64 of the vehicle door frame 14.

As illustrated in FIGS. 3A-3C, when the vehicle door 12 is open, the lever 32, and hence, the actuator 30, will be in the extended position 84. More specifically, the exterior arm 78 of the lever 32 will protrude from the housing 70. Accordingly, the force of the spring bias of the first and second springs 72, 74 disposed inside the housing 70 bias the interior arm 76, as well as the exterior arm 78, of the lever 32 to the extended position 84. Consequently, the cable 94 that operably connects the lever 32 to the catch mechanism 22 pulls on the catch mechanism 22, such that the knob 103 of the catch mechanism 22 is in the non-interference position 26. Therefore, if a user were to rotate the armrest 16 to the deployed position 18 and release the armrest 16, the armrest 16 would rotate under the force of the spring bias of the coil spring 110 back to the stowed position 20, as the knob 103 of the catch mechanism 22 would not engage the latch member 100 disposed proximate the bottom surface 60 of the armrest 16.

Figure 4A:
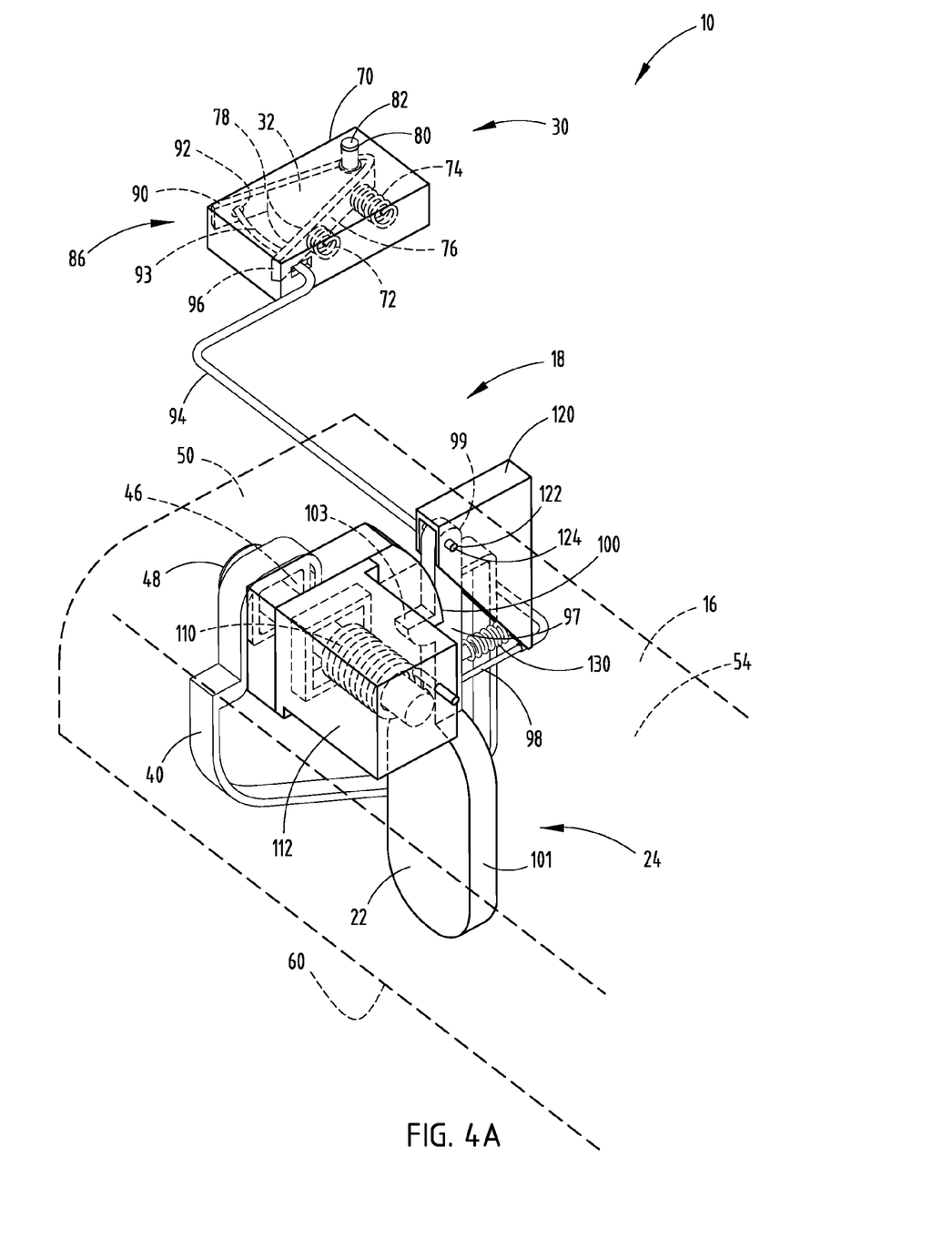
FIG. 4A is a partial top rear perspective view of an armrest when the armrest is in the deployed position.
Figure 4B:
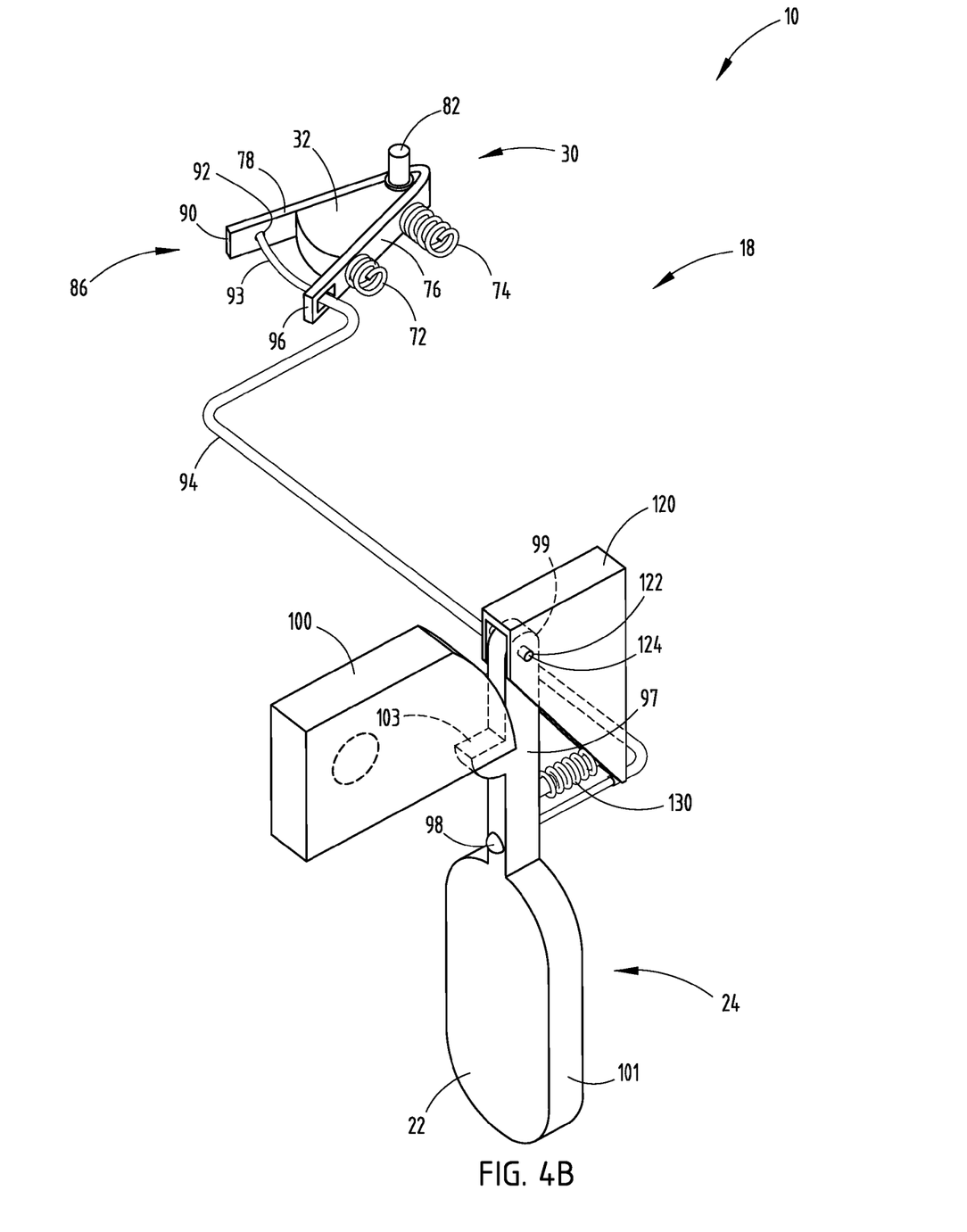
FIG. 4B is a top rear perspective view of one embodiment of an actuator and a catch mechanism when the armrest is in the in the deployed position.
Figure 4C:
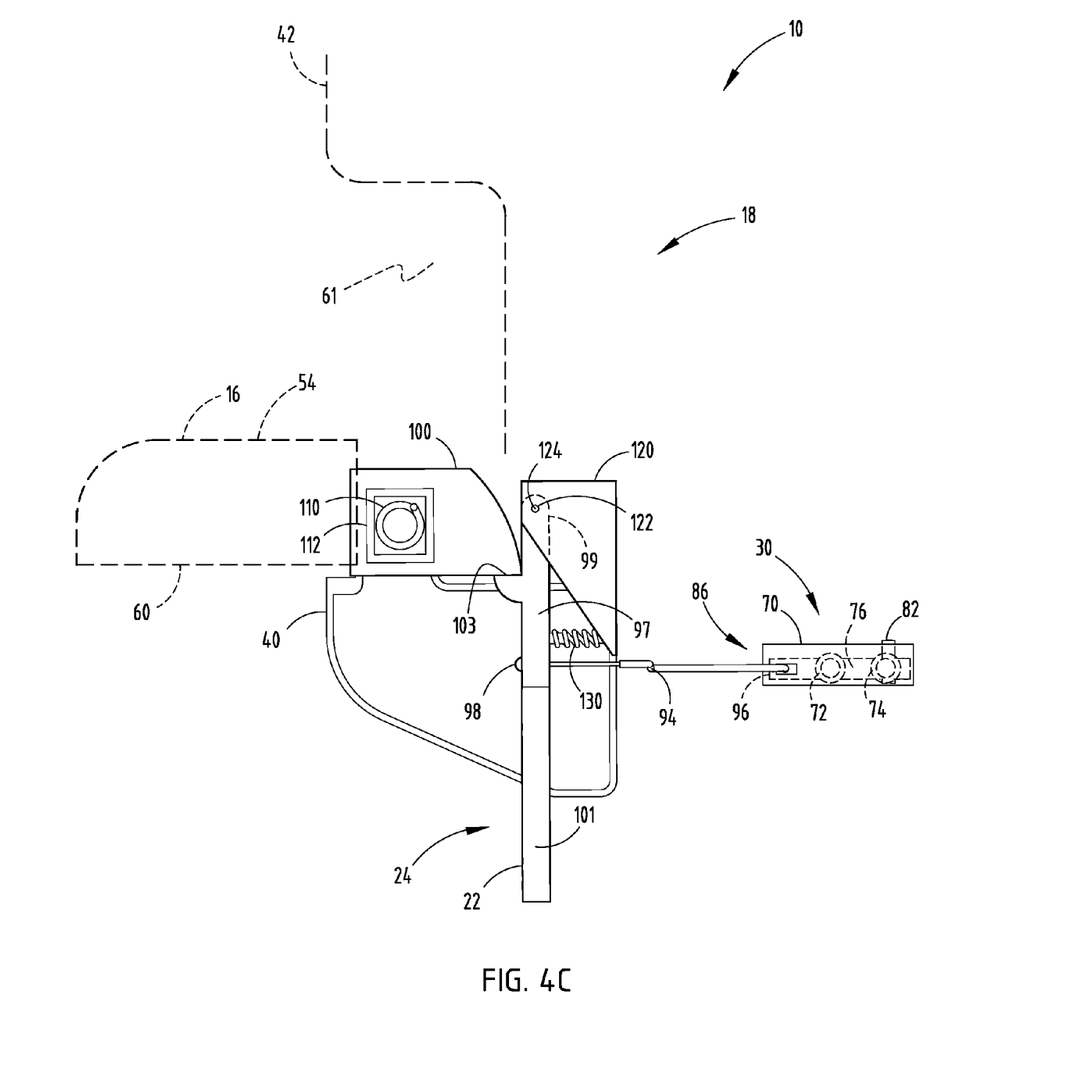
FIG. 4C is a front elevational view of the armrest when the armrest is in the deployed position.

As illustrated in FIGS. 4A-4C, when the vehicle door 12 is closed, the exterior arm 78 of the lever 32 of the actuator 30 is forced to the retracted position 86 against the spring bias of the first and second springs 72, 74 disposed inside the actuator housing 70. Consequently, the cable 94 that operably connects the actuator 30 to the catch mechanism 22 loosens and allows movement of the catch mechanism 22 to the interference position 24 under the force of the spring bias of the compression spring 130. Consequently, when a user rotates the armrest 16 to the deployed position 18, the latch member 100 disposed proximate the bottom surface 60 of the armrest 16 engages the knob 103 of the catch mechanism 22, thereby supporting the armrest 16 in the deployed position 18. The armrest 16 is now available for use by the user inside the vehicle 13.

Upon reopening of the vehicle door 12, the exterior arm 78 of the lever 32 loses contact with the vehicle door frame 14, such that the spring bias of the first and second springs 72, 74 inside the actuator housing 70 once again forces the lever 32 to the extended position 84. At the same time, the cable 94 that operably connects the actuator 30 with the catch mechanism 22 retracts, thereby pulling the catch mechanism 22 against the force of the spring bias of the compression spring 130 to the non-interference position 26, such that the knob 103 of the catch mechanism 22 no longer engages the latch member 100 of the armrest 16. As a result, the armrest 16 rotates under the spring bias of the coil spring 110 back to the stowed position 20, as shown in FIGS. 3A-3C.

Figure 5A:
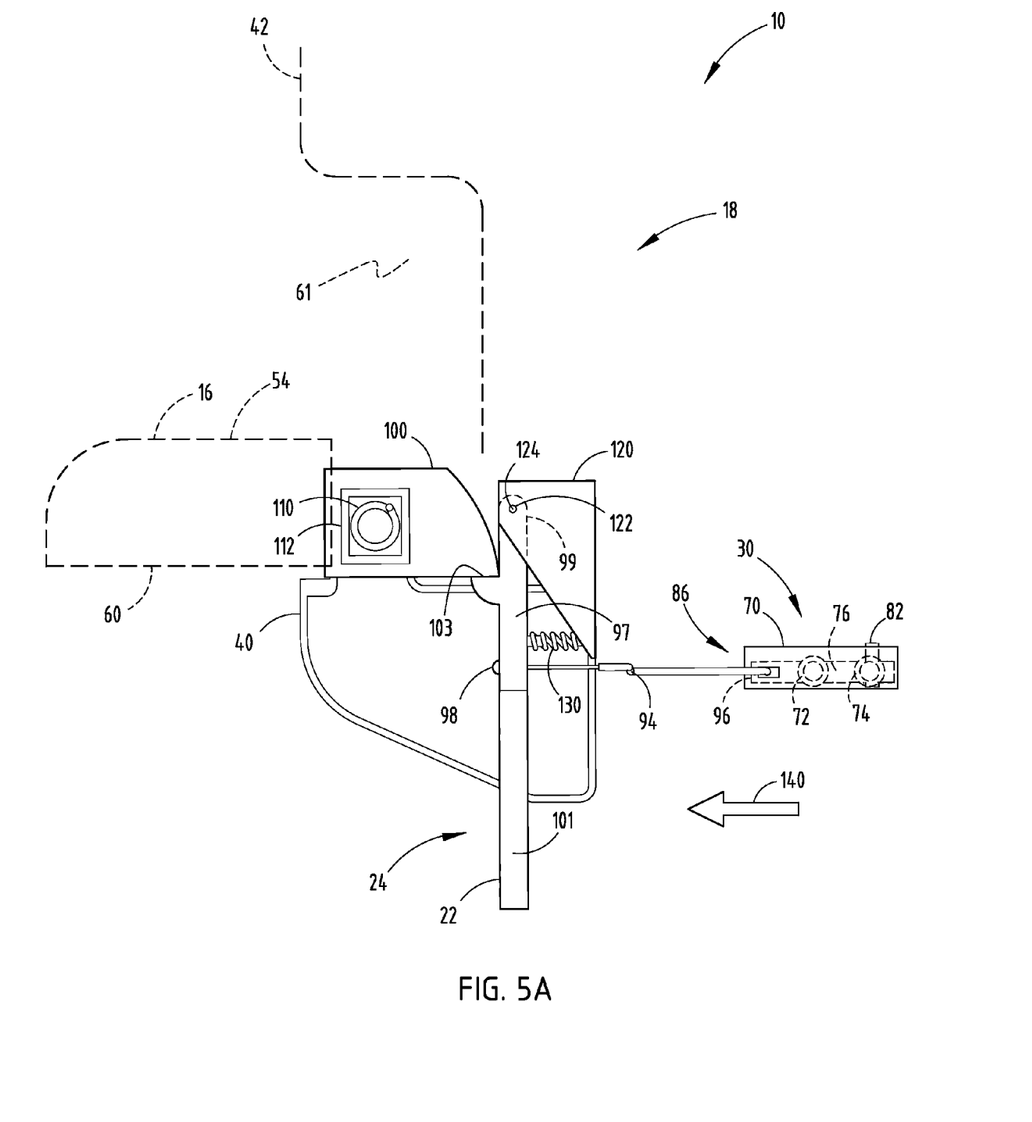
FIG. 5A is a front elevational view of the armrest at an initial stage of impact during a collision event.
Figure 5B:
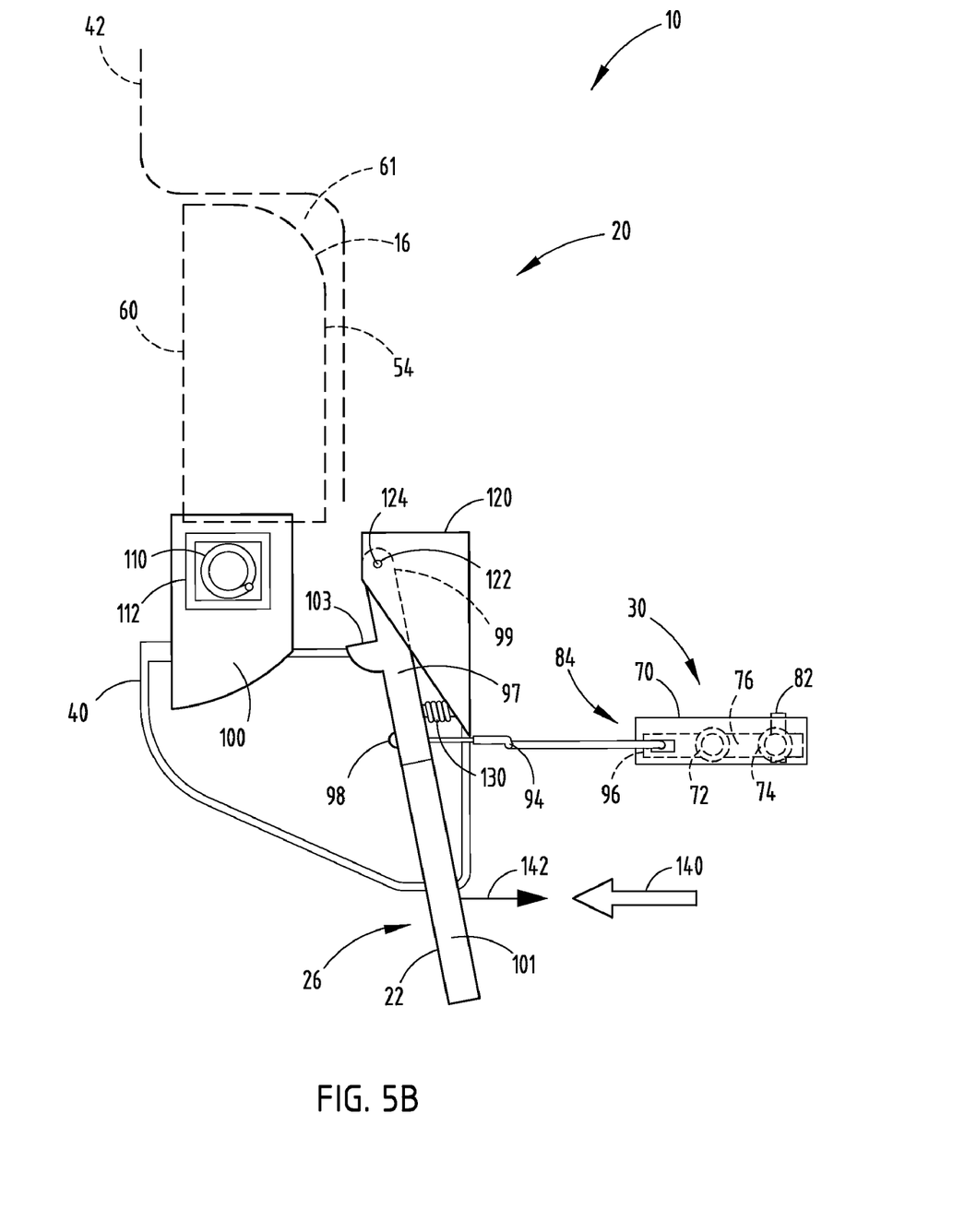
FIG. 5B is a front elevational view of the armrest after impact during a collision event.

Referring now to FIGS. 5A and 5B, the illustrated embodiment of the vehicle folding armrest assembly 10 includes a collision event safety feature that moves the armrest 16 to the stowed position 20, thus limiting or eliminating the contact force the armrest 16 may have with the body of a user. Specifically, in the event that a side collision event occurs in the direction of arrow 140 when the armrest 16 is positioned in the deployed position 18, the weight of the base 101 of the catch mechanism 22 acts in an equal and opposite direction represented by arrow 142. If the collision event force is large enough, the resultant force of the accelerated mass of the base 101 will overcome the outward force applied by the compression spring 130, thereby moving the entire catch mechanism 22 to the non-interference position 26. Stated differently, the inertia of the base 101 overcomes the outward force applied by the compression spring 130. When the catch mechanism 22 moves to the non-interference position 26, the latch member 100 is no longer in contact with the knob 103. Consequently, the interference engagement of the latch member 100 and knob 103 no longer prevents rotation of the armrest 16 by the coil spring 110. Therefore, the armrest 16, under the force of the spring bias of coil spring 110, rotates to the stowed position 20 (FIG. 5B). In the stowed position 20, the armrest 16 does not protrude, or only minimally protrudes, into the interior cabin of the vehicle 13, thereby potentially lessening the likelihood of injury resulting from a user's contact with the armrest 16.

It is generally contemplated that the armrest 16 may include a grasping area on the armrest 16 to allow easy access to rotate the armrest 16 from the stowed position 20 to the deployed position 18. Further, although the mechanism shown is generally directed to a right side vehicle door 12, it will be understood that a left side vehicle door having similar features could also be constructed from this description by providing a substantially mirror-like construction from that disclosed above and illustrated in the figures. It is also contemplated that the various spring biases generally disclosed above may be developed by leaf springs, coil springs, tension springs, compression springs, etc., and that the springs illustrated herein are for illustration only and not meant to be limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle folding armrest assembly comprising:
    a vehicle door movable within a door frame and having an armrest that is operable between a deployed position and a stowed position;
    a catch mechanism movable between an interference position, wherein the catch mechanism supports the armrest in the deployed position against a spring force, and a non-interference position, wherein the catch mechanism is disengaged from the armrest, and the armrest is in the stowed position; and
    an actuator having a lever that protrudes from the vehicle door, wherein abutting contact of the lever against the door frame moves the catch mechanism from the interference position to the non-interference position.

2. The vehicle folding armrest assembly of claim 1, wherein the armrest is retracted into a cavity in the door when in the stowed position.

3. The vehicle folding armrest assembly of claim 1, further comprising:
    a cable operably connecting the actuator with the catch mechanism.

4. The vehicle folding armrest assembly of claim 1, wherein the lever further includes an exterior arm and an interior arm.

5. The vehicle folding armrest assembly of claim 1, further comprising:
    a latch member disposed on a bottom surface of the armrest.

6. The vehicle folding armrest assembly of claim 1, wherein the lever is operable between an extended position and a retracted position and wherein the lever is spring-biased to the extended position.

7. The vehicle folding armrest assembly of claim 1, wherein the catch mechanism is spring biased to the interference position.

8. A vehicle armrest assembly comprising:
    a spring-biased armrest movable between a deployed position and a stowed position;
    a spring-biased actuator; and
    a spring-biased catch mechanism operably coupled with the spring-biased actuator and adapted to engage and support the armrest when the spring-biased actuator has been depressed and further adapted to disengage the armrest when the spring-biased actuator is released, such that the spring-biased armrest moves to the stowed position.

9. The vehicle armrest assembly of claim 8, wherein the armrest is retracted into a cavity in a door when in the stowed position.

10. The vehicle armrest assembly of claim 8, wherein a force of the spring bias of the actuator is greater than a force of the spring bias of the catch mechanism.

11. The vehicle armrest assembly of claim 8, wherein the actuator further includes a lever having an exterior arm, an interior arm, and a lever housing.

12. The vehicle armrest assembly of claim 11, wherein the lever rotates between an extended position and a retracted position about a pin disposed inside the lever housing.

13. The vehicle armrest assembly of claim 8, wherein the actuator is disposed on a front portion of the door and adapted for abutting engagement with a front portion of a door frame.

14. A folding armrest assembly comprising:
    a spring-biased armrest movable between deployed and stowed positions;
    a catch mechanism operably coupled with an actuator and movable between an interference position to support the armrest in the deployed position, and a non-interference position, wherein the catch mechanism does not support the armrest; and
    a base that moves the catch mechanism under the force of inertia to the non-interference position during a collision event.

15. The folding armrest assembly of claim 14, wherein armrest is retracted into a cavity in a vehicle door when in the stowed position.

16. The folding armrest assembly of claim 14, further comprising:
    a cable operably connecting the actuator with the catch mechanism.

17. The folding armrest assembly of claim 14, wherein the actuator further includes a lever having an exterior arm, an interior arm, and a lever housing.

18. The folding armrest assembly of claim 17, wherein the lever rotates between an extended position and a retracted position about a pin disposed inside the lever housing.

19. The folding armrest assembly of claim 14, wherein the actuator is disposed on a front portion of a door and adapted for abutting engagement with a front portion of a door frame.

20. The folding armrest assembly of claim 14, wherein the armrest is spring-biased to the stowed position.

* * * * *